May 10, 1932. R. R. FAUNTLEROY 1,858,079
CONVEYER CHAIN
Original Filed Dec. 6, 1930
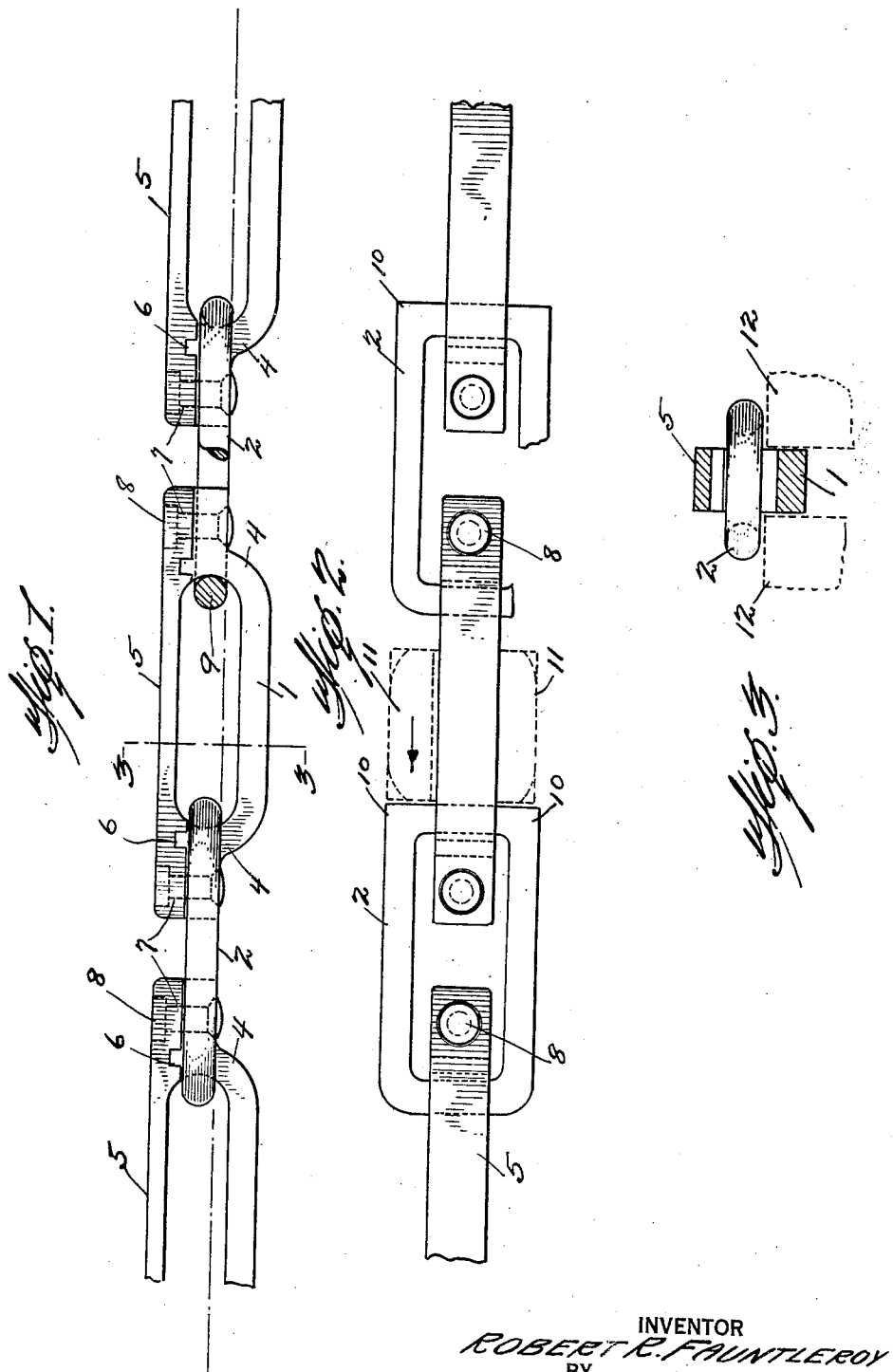
INVENTOR
ROBERT R. FAUNTLEROY
BY
F. P. Gorin
ATTORNEY Patented May 10, 1932

1,858,079

UNITED STATES PATENT OFFICE

ROBERT R. FAUNTLEROY, OF ST. CHARLES, ILLINOIS

CONVEYER CHAIN

Application filed December 6, 1930, Serial No. 500,651. Renewed April 1, 1932.

This invention relates to the improvement in load carrying chains.

The principal object of this invention is to provide a chain of the character of what is generally known as "rivet link chains". A serious objection has always existed in chains of this type, in that the rivets are subject to the full thrust and consequently soon begin to wear, causing a relative movement between the riveted parts, and finally the rivets will cause such displacement between the riveted parts that the sprocket wheels over which these chains usually run will not mesh properly, which has the effect of changing the point of contact of the links with the proper pitch line of the sprocket teeth.

I overcome this defect by providing each link with a tongue and groove connection in addition to one or more rivets, the function of the rivets being merely to hold the tongue within the groove, the relatively broad construction of the tongue and groove construction receiving all the thrust.

An important feature of this chain is to provide a chain that is easy to assemble and disassemble, yet possesses maximum strength and provides almost a continuous load bearing surface.

A second important feature is to provide a link formed of two parts joined by rivets in such a way that the rivets are not subjected to any undue strain due to the movement of the chain.

The links of this chain are preferably cast to reduce the cost of manufacturing.

In the drawings:—

Figure 1 represents a side view of the chain with one link partly in section.

Figure 2 represents a plan view.

Figure 3 is a section taken upon the line 3—3 of Figure 1.

Referring now more particularly to the drawings, reference numeral 1 indicates the load bearing links and 2 the connecting links. The load bearing links consist of two parts, the lower or main portion of the link which turns up at the ends, as shown at 4, and a top bar, as indicated at 5. The general cross section of these two members is preferably rectangular, as shown in Figure 3.

The upturned ends 4 of the lower portion of the load bearing links are provided with keys 6 cast in place. The lower sides of the portion 5 of the load bearing links are provided with slots which fit over the keys 6. These keys and slots are preferably machined to make a more accurate and stronger job. The outer ends of the links are provided with holes 7 through which pass rivets 8. These rivets are countersunk in the top portion 5 of the link to present an unobstructed load carrying surface and may or may not be countersunk in the lower portion of the link. The connecting links 2 are preferably made of a round cross section, as shown at 9 in Figure 1. The back ends of the links 2 are preferably made with square corners 10 to present a wider surface in case the chain is propelled by a sprocket, the propelling teeth of which may be represented by the dotted lines 11 in Figure 2. These chains are generally run in groved guides or rails, as indicated by dash lines 12 (see Figures 1 and 3).

A chain formed from links such as above described would have numerous advantages over those ordinarily used. The top portion 5 carrying the load could be replaced as it became worn or vice versa. The two portions could be made of different metals, depending entirely on the nature of the use to which the chain is put. The lower portion practically assumes the entire pull of the chain while the upper portion supports the load.

What is claimed as new is:—

1. A chain link comprising a lower part formed with a curved inner surface and having upturned ends forming the bearing ends of the link, a rib formed on said ends adjacent the bearing surface, the ends extending longitudinally of the lower part to terminate in flat portions, a top part formed with grooves and terminating in flat portions adapted to interfit with said lower part, and means securing the top and lower part rigidly together.

2. A chain link comprising a lower part formed with a curved inner surface and having upturned ends forming the bearing ends of the link, a rib formed on said ends adjacent the bearing surface, the ends extending longitudinally of the lower part to terminate in flat portions, a top part formed with grooves and terminating in flat portions adapted to interfit with said lower part, and rivets securing the top and bottom portions rigidly together.

In testimony whereof I affix my signature.

ROBERT R. FAUNTLEROY.